United States Patent
Burkhardt et al.

(10) Patent No.: US 11,227,378 B2
(45) Date of Patent: Jan. 18, 2022

(54) SYSTEMS AND METHODS OF GENERATING DATASETS FOR TRAINING NEURAL NETWORKS

(71) Applicant: Software AG, Darmstadt (DE)

(72) Inventors: Rainer Burkhardt, San Diego, CA (US); Anil Kumar Vuppala, Bengaluru (IN); Tridivesh Jena, Carlsbad, CA (US)

(73) Assignee: SOFTWARE AG, Darmstadt (DE)

( * ) Notice: Subject to any disclaimer, the term of this patent is extended or adjusted under 35 U.S.C. 154(b) by 146 days.

(21) Appl. No.: 16/682,880

(22) Filed: Nov. 13, 2019

(65) Prior Publication Data
US 2021/0142467 A1    May 13, 2021

(51) Int. Cl.
*B23K 31/12* (2006.01)
*G06N 3/08* (2006.01)
*B23K 26/24* (2014.01)
*G06T 7/00* (2017.01)
*G06N 20/00* (2019.01)

(52) U.S. Cl.
CPC ............ *G06T 7/0004* (2013.01); *B23K 26/24* (2013.01); *B23K 31/125* (2013.01); *G06N 3/08* (2013.01); *G06N 20/00* (2019.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 2006/0144835 A1* | 7/2006 | Pan | B23K 9/1274 219/124.34 |
| 2016/0193681 A1* | 7/2016 | Pesme | B23K 9/0956 219/130.01 |
| 2017/0032281 A1* | 2/2017 | Hsu | G06N 7/005 |
| 2017/0343481 A1* | 11/2017 | Jahanshahi | G21D 3/001 |
| 2018/0268257 A1* | 9/2018 | Ren | G06T 7/001 |

OTHER PUBLICATIONS

Nafaa Nacereddine, "Unsupervised weld defect classification in radiographic images using multivariate generalized Gaussian mixture model with exact computation of mean and shape parameters," Mar. 16, 2019, Computers in Industry 108 (2019) 132-149, ScienceDirect, pp. 136-139.*

Shahrzad Faghih-Roohi, "Deep Convolutional Neural Networks for Detection of Rail Surface Defects", Mar. 12, 2016, 2016 International Joint Conference on Neural Networks (IJCNN), pp. 2584-2587.*

P.N.Jebarani Sargunar, "Automatic Detection of Weld Defects in Pressure Vessels Using Fuzzy Neural Network," Feb. 2010, 2010 International Journal of Computer Applications (0975-8887).vol. 1—No. 21, pp. 119-123.*

(Continued)

*Primary Examiner* — Omar S Ismail
(74) *Attorney, Agent, or Firm* — Nixon & Vanderhye P.C.

(57) ABSTRACT

A system for generating training datasets is provided. The system uses base images to generate a large number of images that include non-defective and defective characteristics. The generated images are then used to train a model that may be used to predict defects in real world images of a manufacturing process.

18 Claims, 13 Drawing Sheets

(56) References Cited

OTHER PUBLICATIONS

Tianyuan Liu, "A Hybrid CNN-LSTM Algorithm for Online Defect Recognition of CO2 Welding," Oct. 12, 2018, Sensors 2018, pp. 3-12.*

Arikan, Selim et al. "Surface Defect Classification in Real-Time Using Convolutional Neural Networks", Electrical Engineering and Systems Science, pp. 1-16, Apr. 7, 2019.

Cha, Young-Jin et al. "Deep Learning-Based Crack Damage Detection Using Convolutional Neural Networks", Computer-Aided Civil and Infrastructure Engineering, pp. 1-18, Mar. 2017.

Dong, Xinghui, et al. "Small Defect Detection Using Convolutional Neural Network Features and Random Forests" The European Conference on Computer Vision (ECCV) Workshops, pp. 1-15, Sep. 2018.

Ekbatani, Hadi Keivan et al. "Synthetic Data Generation for Deep Learning in Counting Pedestrians" Proceedings of the 6th International Conference on Pattern Recognition Applications and Methods, pp. 318-323, Jan. 2017.

Hou, Wenhui, et al. "Automatic Detection of Welding Defects using Deep Neural Network", 10th International Conference on Computer and Electrical Engineering, Journal of Physics: Conference Series vol. 933, pp. 1-11, Jan. 2018.

Howard, Andrew G. et al. "MobileNets: Efficient Convolutional Neural Networks for Mobile Vision Applications" Computer Science, pp. 1-9, Apr. 17, 2017.

Li, Yiting et al. "Research on a Surface Defect Detection Algorithm Based on MobileNet-SSD", Applied Sciences, vol. 8(1678), pp. 1-17, Sep. 17, 2018.

Mayer, Nikolaus et al. "What Makes Good Synthetic Training Data for Learning Disparity and Optical Flow Estimation?" International Journal of Computer Vision, pp. 1-24, Mar. 22, 2018.

Shahrzad, Faghih-Roohi et al. "Deep Conyolutional Neural Networks for Detection of Rail Surface Defects" Proceedings 2016 International Joint Conference on Neural Networks (IJCNN), Delft University of Technology, pp. 1-7, Jul. 2016.

Tsai, Du-Ming et al. "Saw-Mark Defect Detection in Heterogeneous Solar Wafer Images using GAN-based Training Samples Generation and CNN Classification".

Yao, Gang et al. "Deep-Learning-Based Bughole Detection for Concrete Surface Image" Hindawi, Advances in Civil Engineering, vol. 2019, pp. 1-12, Jun. 16, 2019.

* cited by examiner

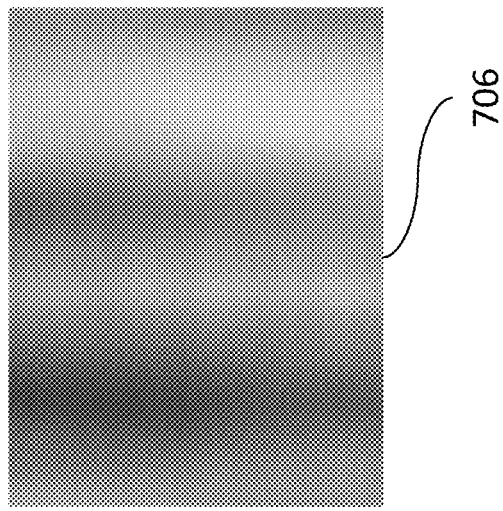
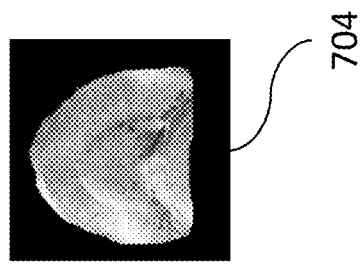
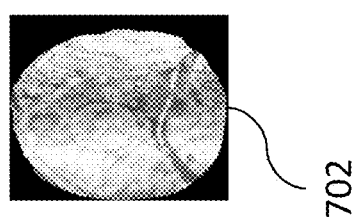
Fig. 7

SYSTEMS AND METHODS OF GENERATING DATASETS FOR TRAINING NEURAL NETWORKS

TECHNICAL OVERVIEW

The technology described herein relates to systems and methods of generating datasets for Deep Learning applications. More particularly, the technology described herein relates to the generation of images related to manufacturing processes and using the generated images to train a Neural Network to identify defects in the manufacturing process.

INTRODUCTION

Machine Learning can give computers the ability to "learn" a specific task without explicitly programming the computer for that task. This may be accomplished by developing a model based on an initial dataset and then using that model to assess new data (usually called "scoring"). One issue with Machine Learning (and in particular Deep Learning) is that the dataset used to develop a model needs to include a lot of samples. Such samples may also need to be balanced and/or diverse in nature. For example, if a model is to be developed based on images, then thousands or millions of images may be needed for training of the initial model. In the case of basic classification problems (e.g., is there a dog in an image), the dataset will need both bad and good samples (e.g., images with dogs and images with no dogs). One issue is that for certain problems, some samples can be relatively rare—especially if real life considerations seek to avoid circumstances in which those samples would occur.

Accordingly, it will be appreciated that new and improved techniques, systems, and processes are continually sought after for generating data for dataset that are used in Machine Learning applications.

SUMMARY

In certain example embodiments, a computer system is provided for creating samples for training purposes that uses techniques that imitate how anomalies are found in the real world. In certain instances, the system can tune up the quantity of such samples by several orders of magnitude in order to provide a robust and diverse dataset of samples that contains defects or anomalies. In certain example embodiments, a computer system is provided to learn and detect defects in images of physical objects, such as welded metallic plates. This is accomplished by generating a large number of data samples (e.g., images) that include defects or anomalies.

In certain example embodiments, a computer system is configured with a general defect detection process that uses image generation. This process can be customized and applied to a variety of use cases and applications. In certain example embodiments, the computer system is configured as an automated welding defect detection system that builds machine-learned (e.g., Deep Learning) models on millions of generated realistic (or near-realistic) image samples of welded metallic plate images. This allows the system (i.e. the built models) to learn the intricacies of real-world welding defects in variety of manufacturing scenarios in which welding is used.

In certain instances, the system may also help correct (or at least identify) the real-world defects in real-world images by sending the localized coordinates associated with an identified defect back to the manufacturing center as real-time feedback (e.g., via an IoT deployed system).

In certain example embodiments, the computer system may be configured (e.g., programmed) to carry out one or more of the following. First, generating a large number of balanced and/or near-realistic data samples (e.g., images) of welded plates. Second, building deep learning models to learn defect patterns from the training data and then continuously make predictions on real-time data incoming from sensors (e.g., images captured via camera sensors). Third, retraining the models with actual images from a production environment. Fourth, alerting users in a manufacturing plant (e.g., through a connected IoT platform) concerning detected defects in a manufacturing process to thereby help prompt taking corrective action in real-time.

The welding defect detection system may serve as a framework for developing deep learning models on generated images and thus save on the manual effort needed for inspecting for defects in welded plates. This can lead to improvements in the quality of the welding while also making the entire manufacturing process more robust and efficient.

In certain example embodiments, a computer system is provided for generating training datasets to train a model that is used to analyze a manufacturing process. The computer system includes non-transitory memory configured to store at least first and second base images. The computer system also includes a processing system that includes at least one hardware processor. The processing system is configured or otherwise programmed to generate a plurality of training images that are each generated by combining the first and second base images together, wherein each of the plurality of images is generated by randomly varying a location of at least the first base image with respect to the second base image. The processing system is configured or otherwise programmed to train a model based on the plurality of training images and corresponding labels associated with each of the plurality of training images. The processing system is configured or otherwise programmed to receive a plurality of real images of the manufacturing process. The processing system is configured or otherwise programmed to generate, for each of the plurality of real images, a prediction by using the model to predict whether a defect is contained within a corresponding one of the plurality of real images.

In certain example embodiments, a non-transitory computer readable storage medium comprising an application program for use with a computer system that generates training datasets for neural networks, the application program comprising instructions that cause the computer system operate in the following manner. Loading a weld seam image and second image of a plate that is to be welded. Generating a preparation image that includes at least two instances of the plate separated by a gap. Generating a training image by sequentially applying a plurality of instances of the weld seam image over the gap, wherein each successive one of the plurality of instances overlaps a prior instance. The location at which each of the plurality of instances is applied over the gap may be varied based on a randomness factor. The generation of training images is repeated until a plurality of training images have been generated. This may be thousands or even millions of different images. The plurality of training images may be varied due to application of the randomness factor that is used in the creation of each one of the plurality of training images. Thus, the plurality of training images may be diverse and robust in nature and include many different examples of defective welds between the plates, including examples that would normally be quite rare.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 7 includes multiple example base images that are used to generate images that show different types of welds according to certain example embodiments;

DETAILED DESCRIPTION

In the following description, for purposes of explanation and non-limitation, specific details are set forth, such as particular nodes, functional elements, techniques, protocols, etc. in order to provide an understanding of the described technology. It will be apparent to one skilled in the art that other embodiments may be practiced apart from the specific details and examples described below. In certain instances, detailed descriptions of well-known methods, systems, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Figure 1:
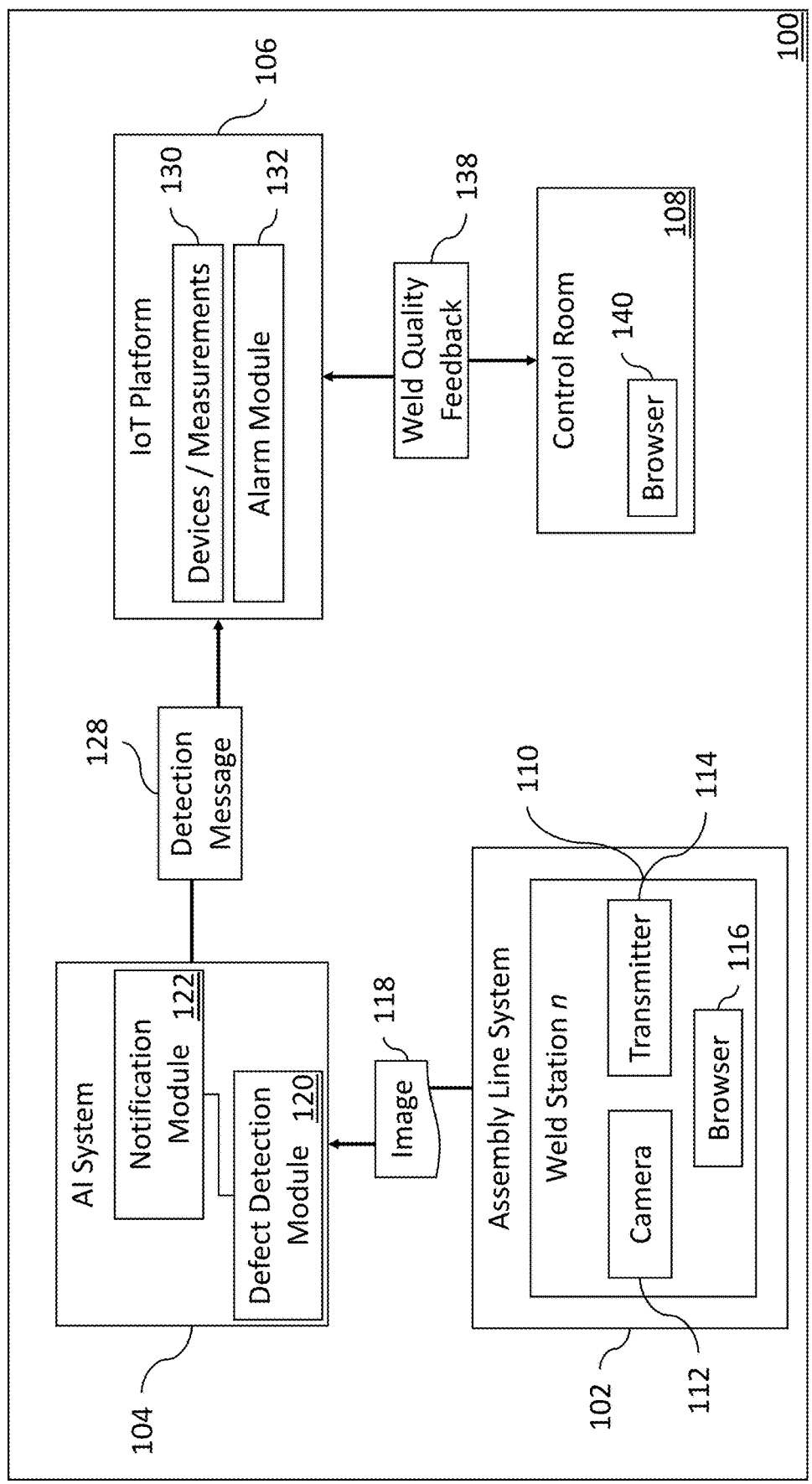
FIG. 1 shows an example welding defect detection system according to certain example embodiments.
Figure 2:
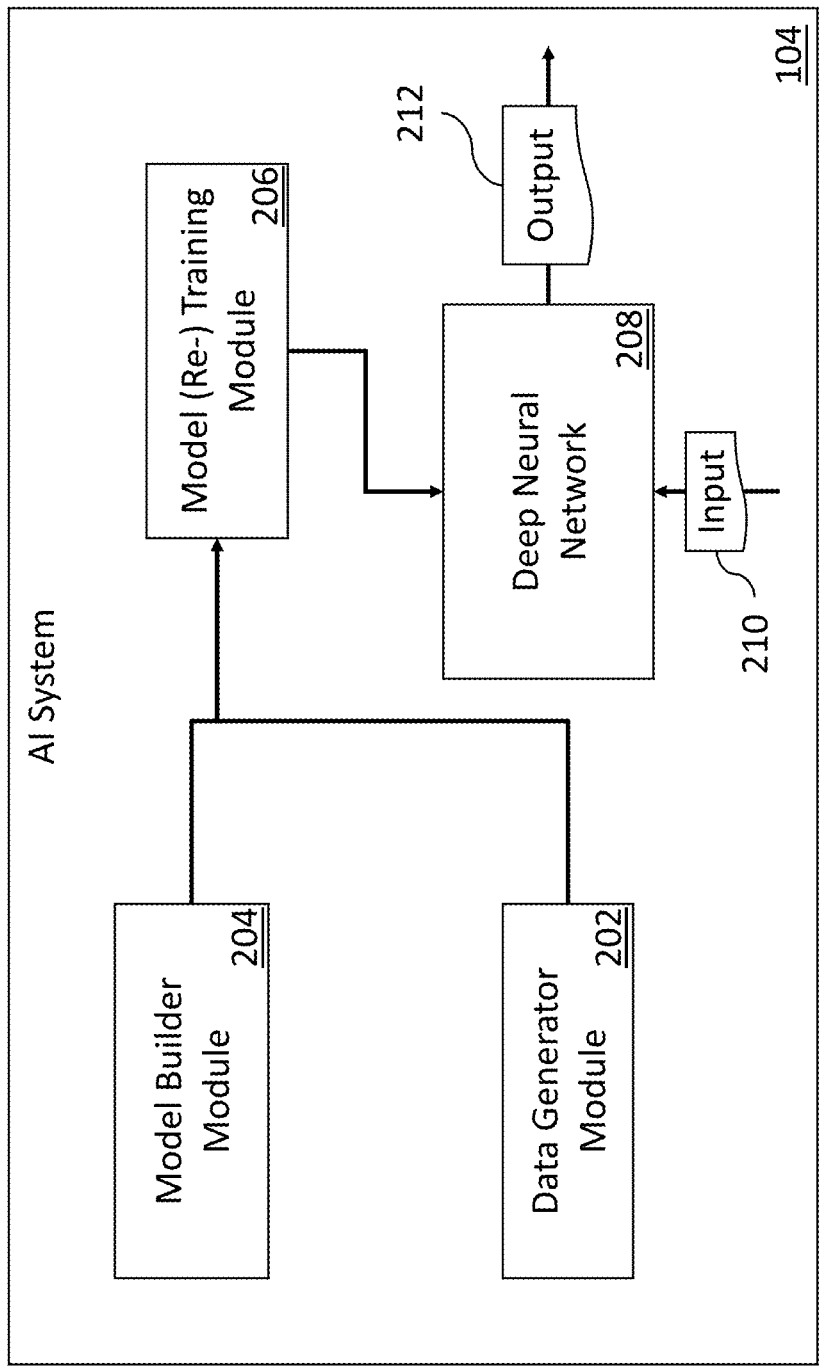
FIG. 2 shows the AI system that is part of the welding defect detection system shown in FIG. 1.

In many places in this document, including but not limited to the description of FIGS. 1 and 2, software modules, software components, software engines, software system, and/or actions performed by such elements are described. This is done for ease of description; and it should be understood that, whenever it is described in this document that a software module or the like performs any action, the action is in actuality performed by underlying hardware elements (such as a processor, hardware circuit, and/or a memory device) according to the instructions that comprise the software module or the like. Further details regarding this are provided below in, among other places, the description of FIG. 13.

Overview

In manufacturing and industrial processes, defects in produced products can occur from time to time. It will be appreciated that a wide range of circumstances can render products defective for their intended purposes. In certain example embodiments, a system is provided to detect physical defects like gaps, cracks, aberrations, divergence and other kind of irregularities on the surface of objects that are part of manufacturing and/or industrial processes. In certain example embodiments, defects in welded metallic plates can be detected using a Neural Network that has been trained on generated images of welded plates.

Figure 5:
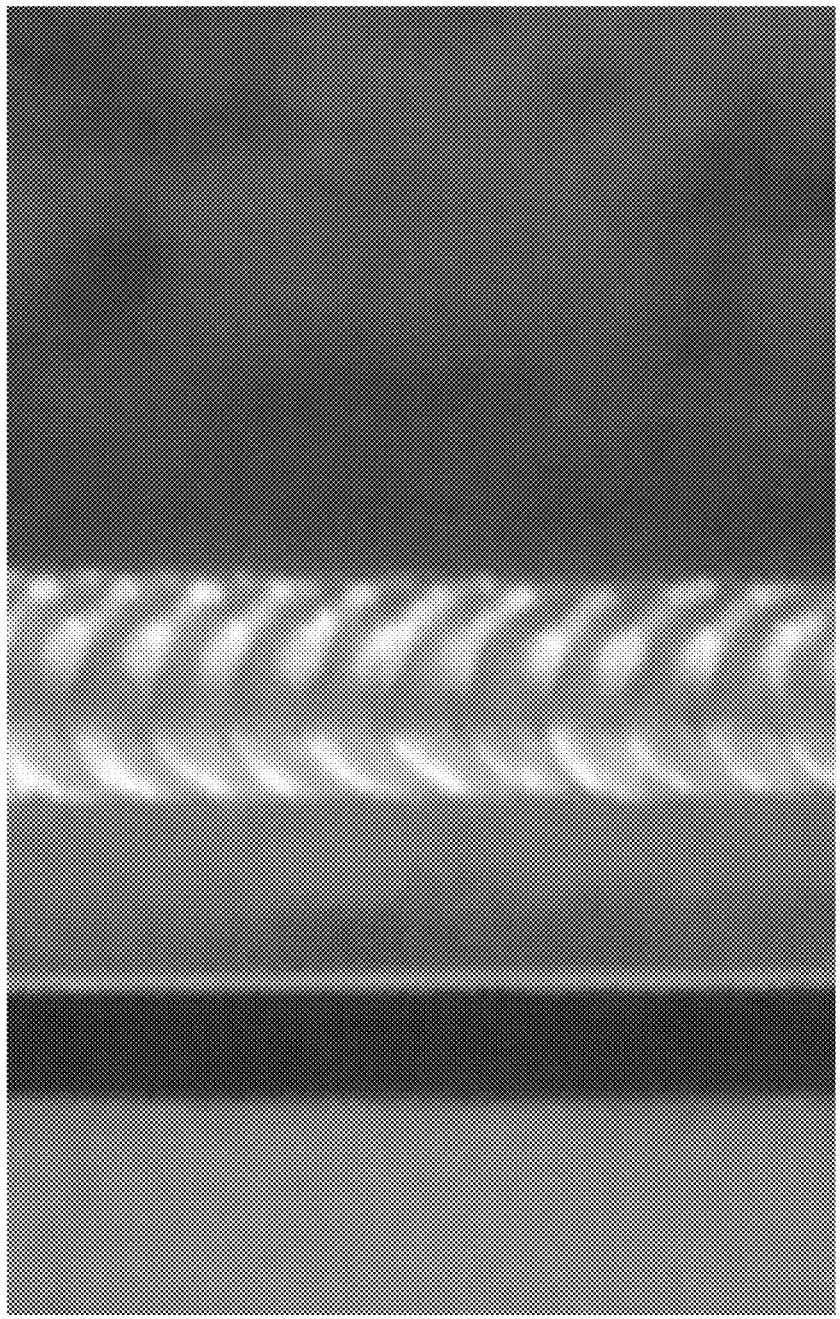
FIG. 5 shows an example image of weld.

In manufacturing, welds are used to join two or more metal surfaces. This is illustrated in the image of a weld that is shown in FIG. 5. Because these connections may encounter different stresses, loads, and/or fatigue over the lifetime of a product, there is a chance they may fail if not created to proper specifications. Thus, the quality of a weld can be important for the overall product.

Weld testing and analysis can be used to assure the quality and correctness of the weld after it is completed. This generally refers to testing and analysis focused on the quality and strength of the weld, but may also refer to technological actions to check for the presence, position, and extent of welds Weld monitoring methods are used to assure the quality and correctness of the weld during or after the process of welding. This can include the automated monitoring of the welding processor for quality purposes and may include, in certain instances, process-control aspects such as vision-based robot guidance.

Thus, it will be appreciated that quality monitoring for welding processes (especially in automated welding situations) can advantageously save production downtime and advantageously decrease the need for product reworking and recall by improving the overall rate of quality welds (e.g., those that meet a proper specification).

Figure 3:
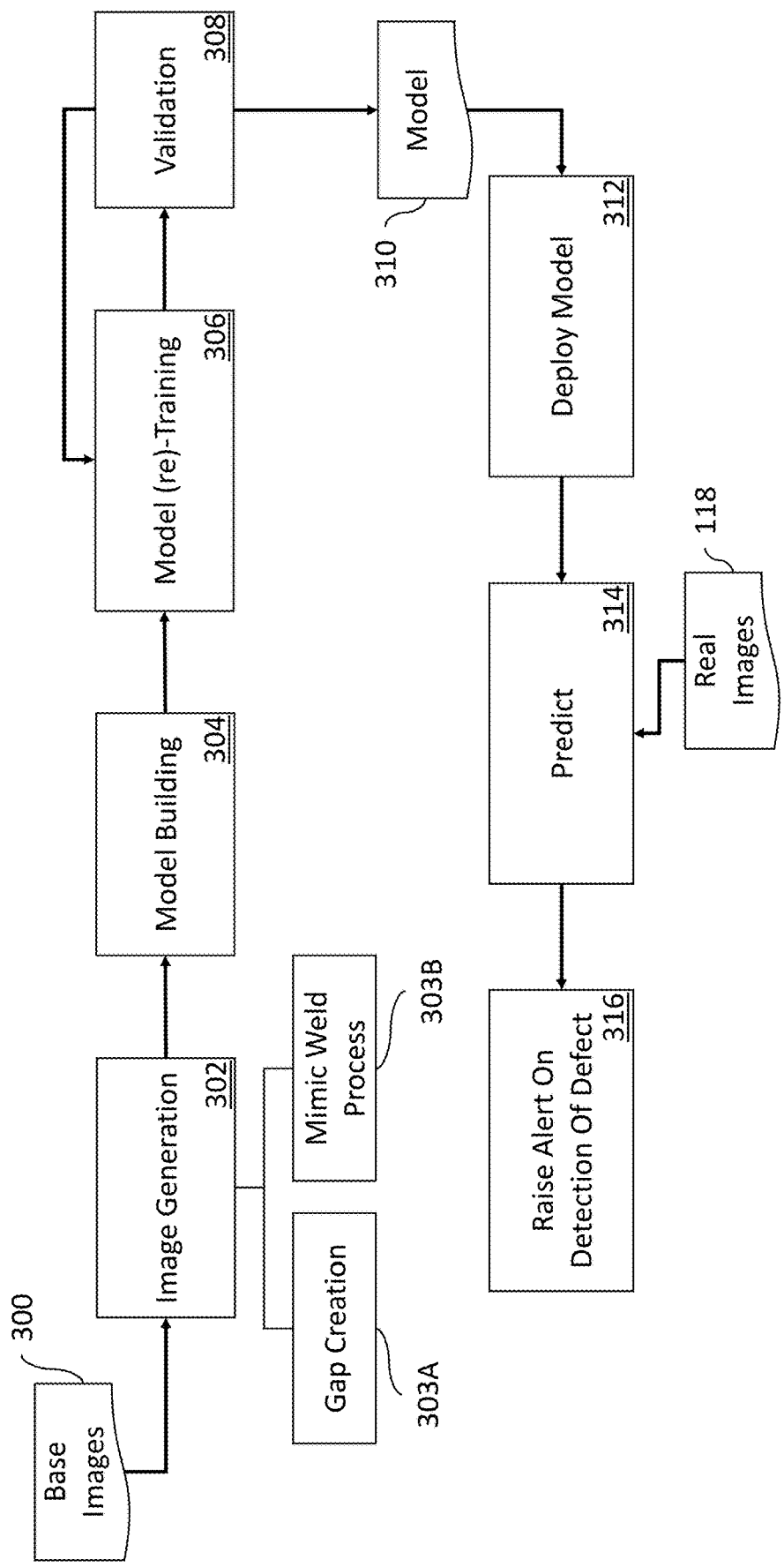
FIG. 3 shows a process that may be implemented on the welding defect detection system of FIG. 1.
Figure 4:
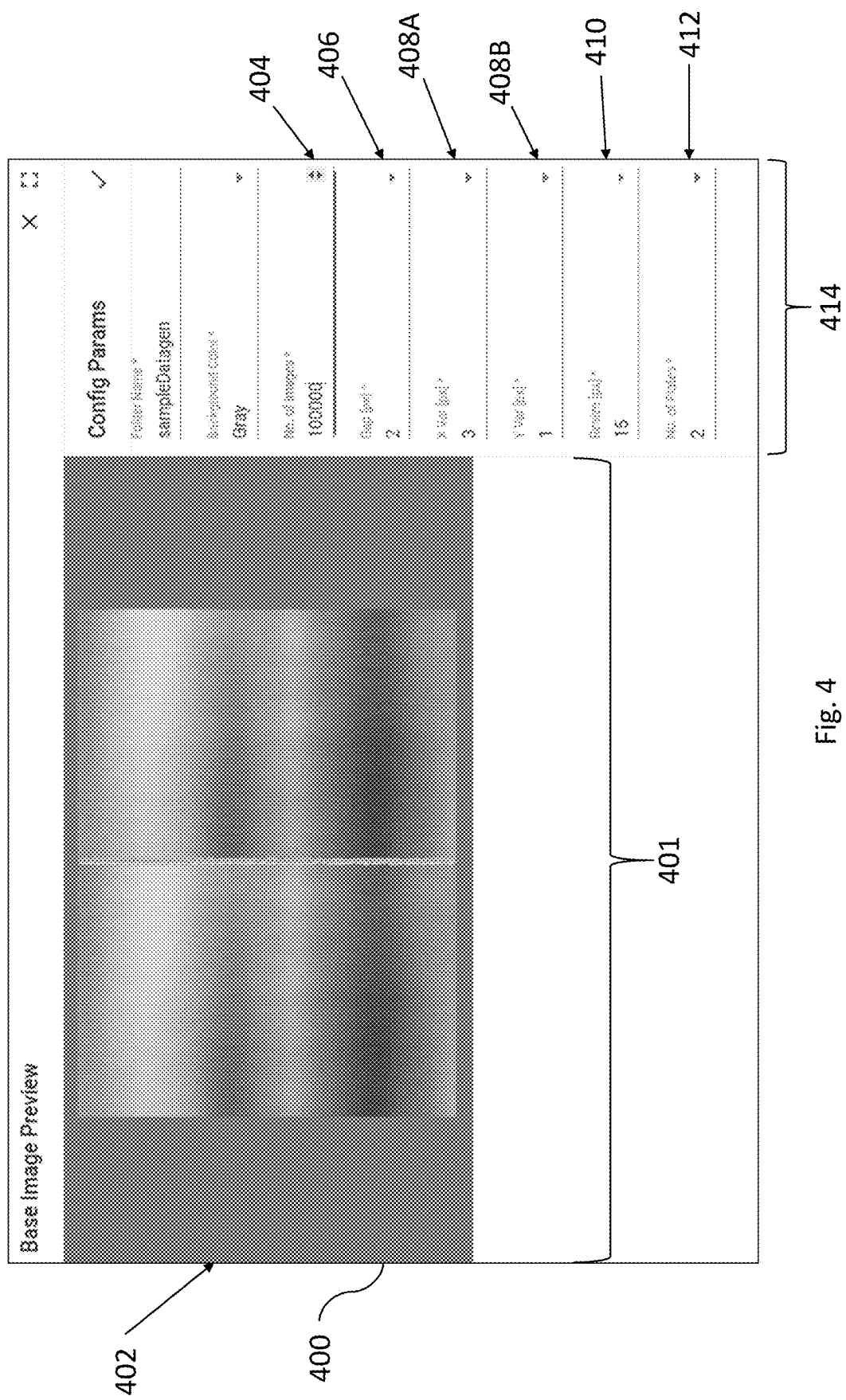
FIG. 4 shows an example user interface for creating images that may be used in training models on the AI system shown in FIG. 2.

FIG. 1 shows an example welding defect detection system according to certain example embodiments and FIG. 2 shows a more detailed example of the AI system included in FIG. 1. FIG. 3 is a process that may be implemented using the system shown in FIG. 1. FIG. 4 shows a graphical user interface that may be provided in conjunction with the system shown in FIG. 1 and be used to control the generation of data for training models. FIGS. 5-12 are images of different aspects of welding that are explained in greater detail in conjunction with the generation of images of welds.

Description of FIG. 1

FIG. 1 shows an example welding defect detection system 100 according to certain example embodiments. The welding defect detection system 100 includes an assembly line system 102, an Artificial Intelligence (AI) system 104, an Internet of Things (IoT) platform 106, and a control room 108.

The assembly line system 102 includes devices and/or computing devices that are part of or coupled to an industrial assembly line that is, for example, an assembly line that is performing welds or other tasks. In this example, the assembly line system includes one or more welding stations 110 that each include a camera 112 and a transmitter 114 (which may be a transceiver as described in connection with FIG. 13. Each welding station 110 may also include an interface or browser 116 for interfacing with the AI system 104, the IoT platform 106, and/or the control room 108. The browser may be used to, for example, provide alerts or other information regarding detected defective welds.

Camera 112 is configured to capture images 118 of a welding process being performed on the assembly line of the manufacturing process. Camera 112 may be, for example an IoT enabled camera sensor that continuously (e.g., every second, or many times per second) captures images of welds that are being performed (e.g., in progress) and/or have been performed (e.g., are completed). In certain example embodiments, the camera may be deployed as part of a robotic arm or other automated welding machine that is part of the assembly line that includes the welding operation. Images captured by the camera may then be transmitted, via transmitter 114, to AI system 104. FIG. 5 shows a portion of a captured image of a weld that has been performed as part of an manufacturing process. Thus, snapshots of a welding process that is being performed by one or more weld stations n 110 may be transmitted to AI system 104 for further processing.

AI system 104 is discussed in greater detail in FIG. 2, but includes a defect detection module 120 and a notification module 122. The AI system may be provided in a cloud-based computing environment and/or provided on one or more of computing device 1300.

Defect detection module 120 is configured to take the image(s) 120 transmitted from the assembly line system 102 and analyze those images for defects. Thus, for example, each snapshot is inspected for defects in the welds based on a previously generated (e.g., trained) model. This is described in greater detail in FIG. 2. If a defect is detected, then the notification module 122 may generate one or more detection message(s) 128 and transmit or otherwise delivery those messages to IoT platform 106 for further handling and/or processing. In certain example embodiments, the detection message may include the location coordinates with the image and/or the weld or plate for which the image was taken.

In certain example embodiments, upon detection of a defect, the AI system 104 may localize the defect by identifying the location of defect within the image (and its corresponding location on the welded plates in question). In certain examples, the IoT system 106 may be used to collect the defect coordinates and transfer such data back to assembly line system 102 where the welding operation is occurring. Such feedback may be provide instant feedback (at least in comparison to previously used techniques) on the quality of welding being performed by the assembly line system 102. The feedback may be used to raise an alarm that alerts a technician in a manufacturing plant that a defect has been detected. The technician may then work to correct the defect. Moreover, since the coordinates of the defective area may be known, such data may be used to control (e.g., automatically) a robotic-arm to take a corrective action on based on the previously detected defect.

IoT platform 106 may be provided on a cloud-based computing environment (and/or on one or more of computing device 1300) separately or in conjunction with AI system 104. IoT platform 106 receives detection messages 128 from the AI system 104 and sends weld quality feedback 138 to the Control Room 108. The IoT platform includes an alarm module 132 and devices/measurements 130. The alarm module 132 may be used to determine whether an alarm should be raised based on the detection messages received from the AI system. For example, the alarm module 132 may include a timer or the like that activates each time a detection message is received from the AI system. If too many detection messages are received in a short amount of time, then the alarm module 132 may send an alarm message. However, if there is only an occasional and non-serious defect that is detected, then the defect detection may be logged for action at a later date and may not require immediate action. Such logging may then be acted upon during scheduled maintenance or the like. In other words, certain alarms may cause immediate action and certain alarms may be logged for future follow-up. Devices/Measurements 130 may store relevant measurement data for welds and other processes. In certain examples, this data may be historical measurement data of welds, generated alarms, and the like.

Control room 108 represents a control room of a manufacturing plant in which the assembly line is located (although it may also be offsite as well). A supervisor or other user can interact with and keep track of the detection notices that are being processed by the IoT platform 106 via browser 140. This may include having the IoT platform 106 push weld quality feedback 138 to the browser for review by the user in the control room 108. For example, notices or alerts regarding weld quality issues may be provided to the user via the browser 140 (or other graphical user interface). In certain example embodiments, the user may provide feedback back to the IoT platform 106 in the form of additional input on the nature of the detected defects. For example, the user may label or classify detected defects as non-defective. Such data may then be fed back into the model that is being used by the AI system 104 (e.g., thus re-training the model). In certain examples, the control room 108 may itself be an automated or machine learned system or the like.

Description of FIGS. 2 and 3

FIG. 2 shows the AI system 104 that is part of the welding defect detection system 100 shown in FIG. 1. As discussed above, AI system 104 may be provide don computing device 1300 and/or may be provided within a cloud-based computing environment. FIG. 3 shows a process for generating training datasets and employing such datasets to generate models used to detect defects in real world images. The AI system 104 includes a data generator module 202, a model builder module 204, a model training module 206, and a trained (deep) neural network 208.

Figure 6:
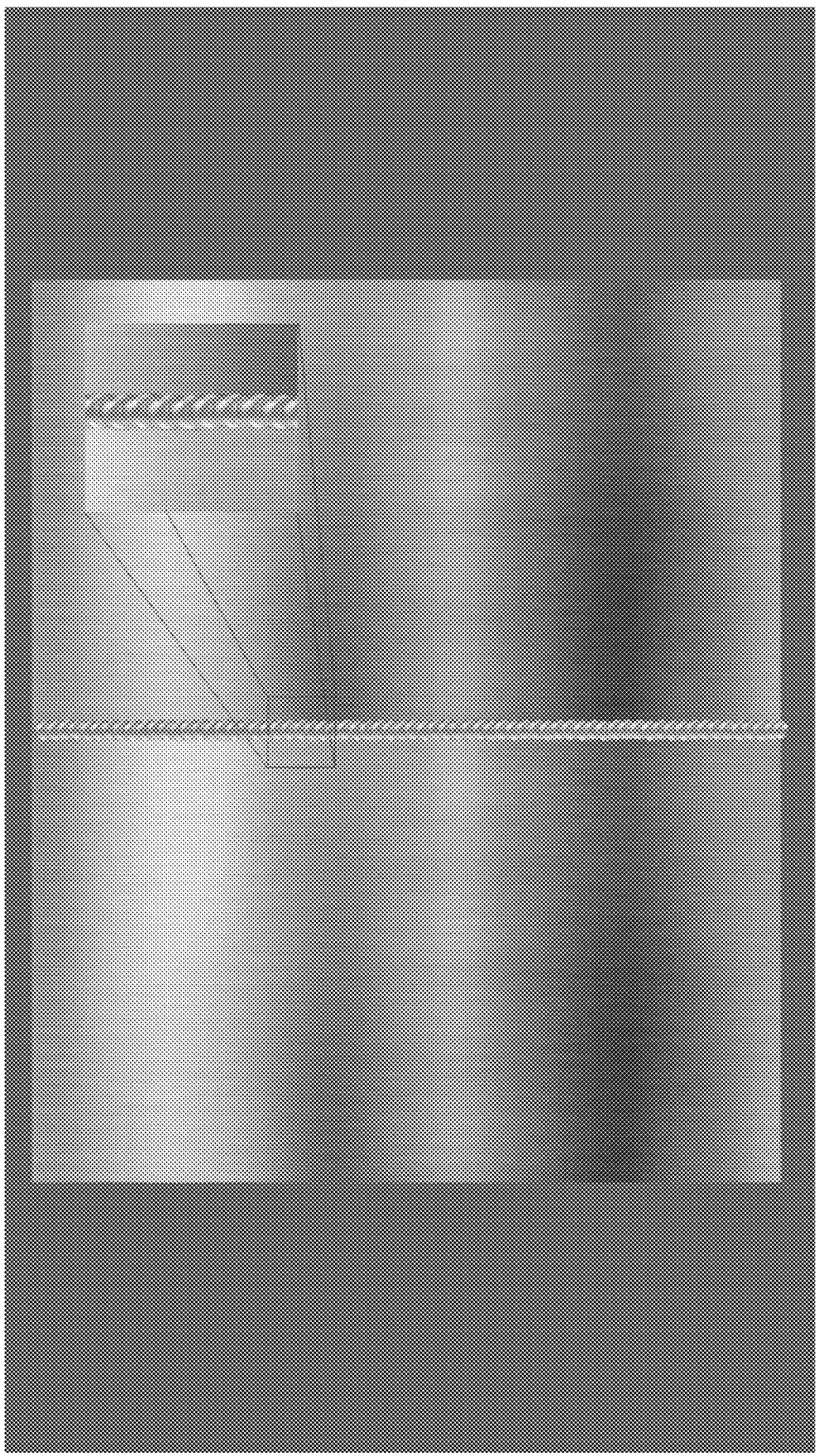
FIG. 6 is an example image of a synthetically generated weld according to certain example embodiments.

The data generator module 202 allows users to create a large number of images of welded metallic plates for building deep learning models. An example of such an image is shown in FIG. 6, which includes a blown up portion of a welded area between two metallic plates. An example interface for data generator module 202 is shown in FIG. 4. Users can use the interface shown in FIG. 4 to customize the properties of the base images and how they are combined to generate the training datasets.

Model builder module 204 is for building models. In certain examples, this may include using deep learning architectures like MobileNets or custom models that are built according to user or organizational requirements. The model builder module 204 may include options for setting network parameters like the number of layers, layer types, optimization functions and the like. The output from the model builder module is a model that is to be trained using training data.

Model training module 206 is used to, after creating the model architecture using the model builder module 204, train models using generated data from data generator module 202. In certain examples, the models are initially trained exclusively on synthetically generated datasets. However, in certain other examples, real data may be included in the initial training dataset.

In certain examples, training of the model may be controlled through parameters like number of epochs and learning rate. In certain example embodiments, the model train module 206 may also handle re-training of an already trained model. This may be accomplished when there is new data available to train the model. For example, feedback from a user in the control room on weld quality may be used as an additional input vector (e.g., for previously detected defects that are determined not to be defects).

Deep neural network 208 is the output from the model training module 206 and takes input 210 that is (e.g., continuously) supplied to it and provides outputs 212 based on the model. In other words, the deep neural network 208 may make predictions (whether there is a defect in a weld) based on the incoming data (images of welds). As discussed herein, an example of input 210 are images of a welding process and output is whether there is a detected defect within such images (and potentially the location of the defect within the image).

It will be appreciated that a hurdle that can prevent industries from using machine learning techniques is a lack of relevant data that can be used to train models. In particular, despite the advances in deep learning, these algorithms still require thousands or millions of data samples to learn relevant features of objects. While models can be trained on smaller data samples, this can lead to faulty predictions when the model is deployed in a real world environment. Certain techniques of over sampling can be used to try to address this issue, but in many cases these techniques will cause over-fitting of the model on the over-sampled data.

Large input data requirements are further complicated in connection with certain real world situations that occur infrequently. For example, fraud detection and anomaly detection tend to have real world datasets that are highly imbalanced as the number of anomalies within a given dataset tend to be vastly outnumbered by "normal" samples within the dataset. This imbalance tends to hold for welding defect detection as it deals with detecting defects, which are (hopefully) rare incidents. Thus, if real world images were to be used exclusively to train models then the defective weld samples would tend to be a fraction of good samples (e.g., those without defects). Such an imbalance could then fail to properly train the model for detecting accurate defect representations.

A further potential issue is also that even in a case where there is enough data, annotation of large number of images can still be a challenging problem. Specifically, with problems like detecting welding defects, the deep learning models may require the location of the defects within each image. Manually annotating a large set of images requires lot of time and effort and is also prone to errors.

In certain instances, the problem of acquiring a large enough dataset can be a problem with Generative Adversarial Networks (GANs) as well. This is because such implementations tend to require large datasets in order to learn the underlying data distribution of source dataset and generated images. For images to be near-realistic GANs would have to be trained on very large datasets.

Accordingly, the techniques discussed herein (e.g., in connection with FIGS. 2 and 3) seek to address such problems. For example, data generator module 202 is configured to generate millions of distinct, near-realistic samples of welded metallic plates with and without defects. These samples are automatically labeled and, for samples with weld defects, the location of each defect within the samples is automatically identified.

In certain examples, parameters may be used for creating images of welded metallic plates. This is shown in FIG. 4. These parameters may be set by a user and can be used to generate good and defective images that will be used to train a model. In certain examples, the parameters may be used to define or set a valid range for non-defective welds. Thus, for example, a user may set a horizontal variance (e.g., X var) of 2 pixels for where the seam images may be positioned. Placement of the image within that range may indicate a valid (e.g., non-defective) placement of the seam for that location. Images that are generated without defects may be labeled as non-defective.

The generation of images with defects may be accomplished by using a higher range for the various parameters that are provided by a user. For example, by increasing the variance by 50% (or some other factor or absolute value) of the parameters. Thus, for example, when a user defines a 2 pixel variance in the X direction, defective welds may be generated when the seam is greater than (or equal to in certain example embodiments) 3 pixels of variance. In certain examples, the variance is with respect to an ideal position for the seam or other positioning property. In certain examples, any or all of the X var (408A), gap between the plates (406), and the resize parameter (410) may be adjusted in generation of images with defective welds. Such images may also be labeled as defective at the time of generation when the resulting randomness is determined outside of a threshold tolerance level (e.g., 50% beyond the initially set user parameter). In certain examples, the tolerance level may be manually defined by a user (e.g., to be 25%, 100%, or a flat value such as 1 additional pixel, etc.). In certain examples, the tolerance level may be dependent on the relative to the size of image of the plates. Note that in certain example embodiments, the Y var may not be varied to the point where it is outside of a tolerance level. Thus, a dataset of training images that includes images of both non-defective and defective welds may be generated.

The synthetically generated images are then used as inputs to train the model that is then deployed to analyze the real-world images that are supplied to it. FIG. 3 provides an example for how this generation of images is performed.

Referring now more specifically to FIG. 3, base images 300 are used as inputs to construct thousands or millions of welding images. In certain example embodiments, base images 300 include two base images that are provided as inputs. These are 1) an image of metallic plate; and 2) an image of weld seam. Two examples of different welding seams are shown as 702 and 704 in FIG. 7. An example of an image of metallic plate is 706 in FIG. 7. Multiple such images may be supplied and the generation of synthetic welding images may be based on a combination of such base images. In certain example embodiments, a single seem (e.g., 702) may be used throughout the entire process of generating one (or multiple) image(s). In certain examples, a single plate (e.g., multiple instances thereof) may be used throughout the entire process of generating one (or multiple) image(s). In other words, two instances of the same plate (e.g., one image is a copy of the other image) may be used to represent two "plates" that are to be welded together. For example, the two plates shown in FIG. 8 may be different instances (e.g., copies) of the same image of a plate. In other examples, images of different plates may be used for the different plates that are welded together. These images may be created or selected according to the requirements of a user or organization. The images may be close to actual weld plates and weld seams being used in the target manufacturing process. Thus, for example, different manufacturing processes that use different types of plates and/or different welds may be used to generate different input dataset.

Base images 300 are provided to image generation 302. A goal of step 302 may be to ensure that the generated images of welded plates would reflect the properties of actual welded plates.

Figure 8:
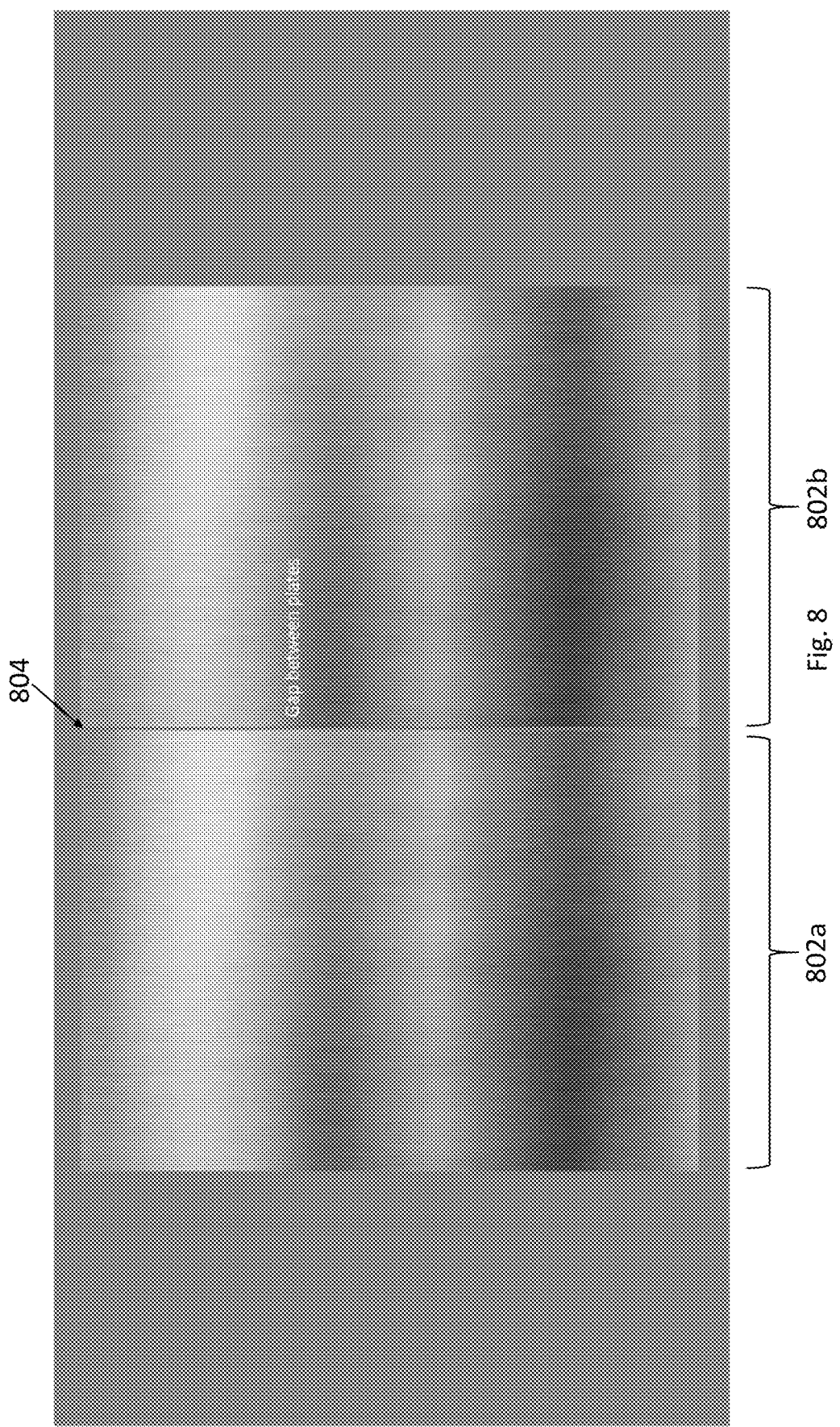
FIG. 8 shows an image of how two plates may be positioned with a gap there between according to certain example embodiments.

The generation of images at 302 may include two sub process for generating images of welds. These include the setting or creation of a gap between the base plates (e.g., multiple instances of plate image 706) at 303A and the mimicking of the welding process to create a seam at 303B. The setting of a gap between two instances of a plate (or two different plate images) is illustrated in FIG. 8 and discussed in greater detail below. As shown in FIG. 8, plate 802a is separated from plate 802b by a gap 804.

Figure 10:
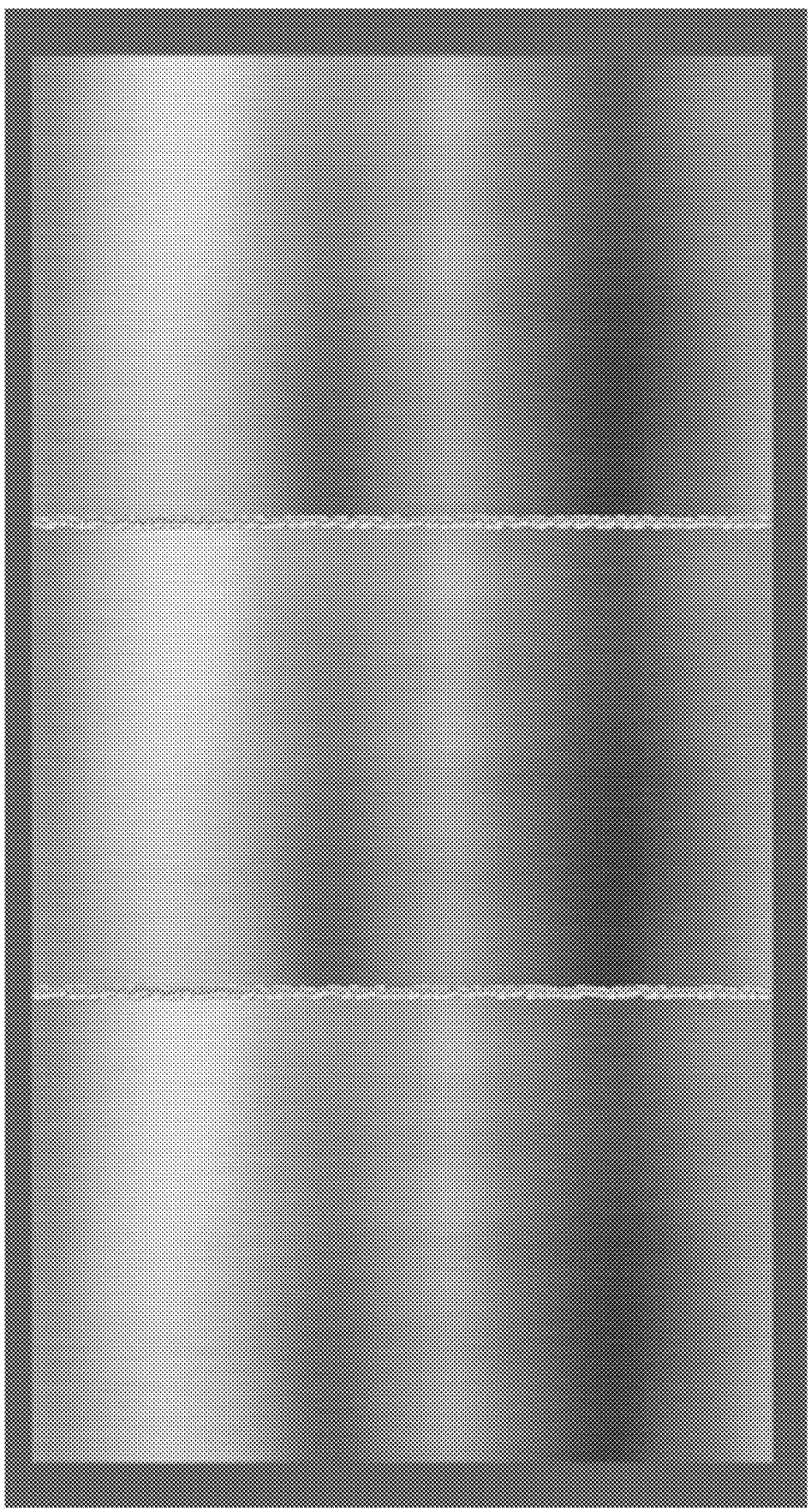
FIG. 10 shows an example generated image for three plates with two welds holding those plates together according to certain example embodiments.

At 303A, the raw metallic plate image provided as part of 300 is used to create an image of two plates put together with a slight gap between them. In certain examples, more than two plates may be used (e.g., if the manufacturing process is welding three or more plates together)—this is shown in FIG. 10. In other words, the system at 303A may be designed to recreate the physical manufacturing step where the plates to be welded are positioned just prior to the start of the welding process.

Figure 9:
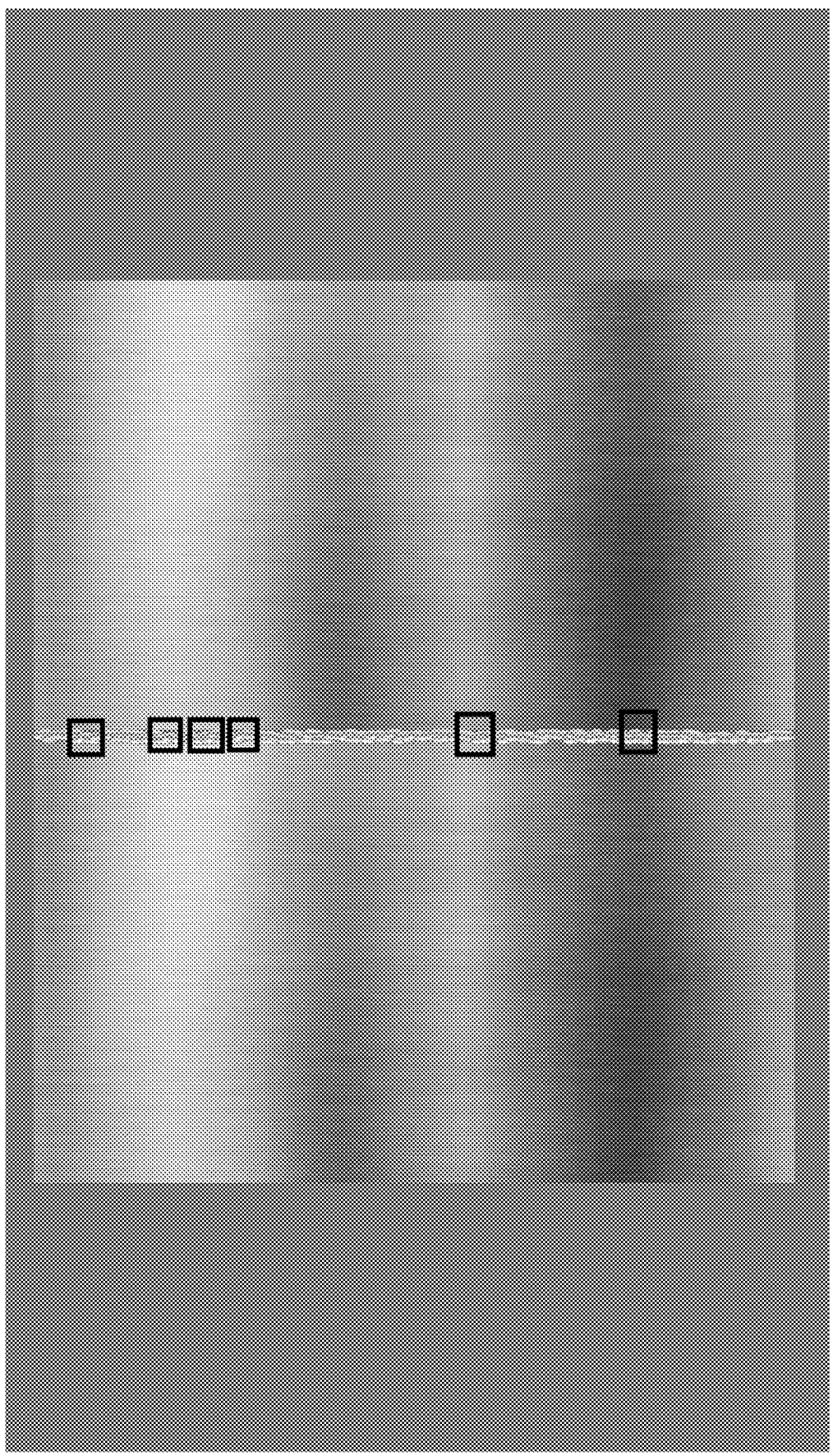
FIG. 9 shows an example generated image that includes multiple defective areas according to certain example embodiments.

At 303B, the system modifies the images in manner that imitates the actual welding process—e.g., where a robotic arm moves across a gap between the plates filling it with the welded seam. Thus, just as with the welding process, here the image generation process moves from top to bottom (or bottom to top depending on the operation of the actual process) by overlapping seam images (e.g., 702 and/or 704) with the image of positioned plates to generate the input seam image across the gap between plates. Each individual seam image may be overlapped with the previously positioned seam image (similar to how the physical welding process operates). This overlapping continues until the weld is completed to the top (or bottom) or the image. An example of an image with no defects is shown in FIG. 6, while an example of an image with defects is shown in FIG. 9. Examples of weld seams that include no defects are shown as 1102 and 1104 in FIG. 11. Examples with weld seams that include defects are shown as 1106 and 1108 in FIG. 11.

As part of generating the images, the image generation process 302 introduces randomness into the movement of seam with respect to the gap. This random movement of seam results in images with defects. For example, one seam may be 2 pixels to the left of center, and the next 2 pixel left of that, which may result in a defect. Thus, irregularities and gaps in welding can occur by randomly assigning where each seam element is located within the overall weld. It will be appreciated that without this randomness component, that all of the resulting images may look similar and potentially have no defects. The inclusion of this randomness technique can thus advantageously provide an increased number of quality images that include a variety of defects for the system to train a model on. In certain examples, as discussed below in connection with FIG. 4, the randomness may be controlled through a X variable, a Y variable, and a randomness factor (e.g., the technique used to generate the randomness). The breadth of different welding defects that may be produced using this technique can then be used for learning defective patterns in welded plates through deep learning. It will be appreciated that the term randomly as used herein includes pseudo-random techniques.

The image generation process 302 is performed to create thousands or even millions of different images. As each image is generated using this process they are automatically labeled as being defective or non-defective based on the randomness aspects applied to the generation of the image and how the seam has been created. In certain examples, the location of each defect within the images is also labeled. This is illustrated in FIG. 9 in which the defects have been automatically identified in the synthetically generated image of a weld. Both images that include defects and those that do not have defects are generated using these techniques. In certain example embodiments, equal numbers of defective and non-defective images may be generated using these techniques. However, this may be tuned according to particular organizational needs or particular machine learning problems. It will be appreciated that these techniques allow for more images that include defective aspects of the target process to be generated than otherwise would be available to thereby increase the robustness of the model that is trained on these images.

The images generated from image generation 302 are then used to train, at 306, the model that is built at 304 (via the model builder module 204).

In certain example embodiments, Convolutional Neural Networks (CNN), a class of deep neural networks, is used to train the model. CNNs can be useful for image recognition and classification problems. In certain examples, the MobileNet CNN architecture may be used to for the model training aspect of certain example embodiments. Mobile-Nets are based on a streamlined architecture that uses depthwise separable convolutions to build light weight deep neural networks. Using these techniques, the model may be trained on, for example, welded metallic plate image data, to learn the defect patterns in the provided data.

In example embodiments, after being trained on the generated data (e.g., provided from the data generator module), the model can be retrained on (relatively) few samples of actual (e.g., images of a real manufacturing process) data at 306 and 308). This may make the model more robust is detecting the defects. This is possible because of Transfer Learning in Deep Neural Networks. Transfer learning allows a model to build on already learned knowledge of the Neural network on similar data instead of training from scratch. Using these techniques, the evaluated model performance on new, unseen samples of data (e.g., generated data), the model detects defects with 95% accuracy. This is an improvement over prior techniques in the welding industry and may thus improve the performance of a production line welding process.

The trained model is then subjected to a validation process at 308 using, preferably, and independently developed dataset. This may result in retraining the model (or even discarding it should it not pass validation standards). Once a model is validated, the resulting model 310 is deployed to a production environment at 312. In certain example embodiments, the model may be deployed to an edge device (e.g., welding station 110) to provide near real-time feedback. In certain example embodiments, the model may be deployed to a cloud based environment that may provide for more centralized control of the model and input that is being applied to it.

In any event, in the production environment, real images 118 are then subjected to the model at 314 to provide predictions on the quality of the weld within the provided images. The model is used to scan the provided images using, for example, a sliding window that looks for welding defects. On detection of defects, coordinates of the defect location on welded plates are marked or otherwise stored as defective. An example of this is shown in connection with FIG. 12 where the indicated area with in the analyzed image is blown up to show where the defect is located. In certain examples, this area may be stored using coordinates or the like.

The output of the model prediction process is then passed to 316, which may then raise an alert upon detection of a defect within the image. In certain examples, the alert may include the coordinate data for where the defect is located.

Description of FIG. 4

FIG. 4 shows an example user interface 400 for creating images that may be used in training models on the AI system 104 shown in FIG. 2. Specifically, the data generator module 202 may include the ability for users to customize the generation of welded plate images according specification or user requirements. This may allow for tuning parameters like the gap between the welded plates, background of the plates, position and size of the seam across horizontal and vertical axes, randomness across both axes. This may thus allow for the generation of a large number of evenly distributed data of welded metallic plates.

FIG. 4 includes a graphical user interface (GUI) 400 with a main image area 401 that includes the preview image 402 that has been generated according to the configuration variables specified in the configuration parameters section 414 of the GUI 400.

The configuration parameters section 414 includes a number of images parameter 404 that indicates the number of images that will be generated by the data generator module 202 using the provided parameters.

Gap parameter (in pixels) 406 indicates the space between the plates (or the images of those plates). This parameter controls the separation between the plates to be welded. The gap between the plates may be increased or decreased by changing the value of this parameter. The size of the gap may correlate to the magnitude of the defects generated. In other words, a larger gap may lead to larger sized defects in the welding process. FIG. 8 illustrates how the gap between the plates may be arranged.

Parameters 408A and 408B control the variance of the seam across the gap in both the X (horizontal) and Y (vertical) directions. These variables may be thought of as the degree of freedom of the movement of the seam (e.g., the randomness of seam in vertical and horizontal directions). Increasing the horizontal randomness leads to high degree of movement of seam horizontally across the gap and generally leads to more defects. Vertical randomness controls the movement of seam vertically and will affect how uniform and dense the seam is. FIG. 9 shows an example image that has been generated with a welded plate that has a relatively high horizontal (x) variance. The defective areas are highlighted in FIG. 9.

Resize parameter 410 controls the size of the seam that is generated. This parameter control how big or small the seam should be. It will be appreciated that the resize and gap parameters may be tuned together to produce images with a desired number of defects and to control the size of defects. When the resize parameter is set to relatively smaller values, it can lead to defective images of welded plates as the smaller size of the seam cannot fill the gap between the plates. This can then expose the gap that is between the plates. Higher values for the resize parameter can act to decrease the chance of defect being generated in the welded plate images.

The number of plates parameter 412 may be included to generate images with the indicated number of plates. FIG. 10 shows an example of images generated for three plates.

Additional parameters may include the background color of the image of a plate. This may be used to determine the perimeter of a plate within the provided image. In certain example embodiments, the user interface may include a parameter (or command) that indicates what percentage of "good" to defective images are to be generated. Thus, for example, if a user decides to generate 100,000 images (e.g., via the 'Number of images'), then the system may be programmed to, by default, generate 50,000 images with no defects and 50,000 defective images. In certain example embodiments, default ratio (e.g., 0.5) may be adjusted by the user. For example, a user may determine that 70% of the generated images should be good an may accordingly set a ratio to 0.7. This will cause the system to generate 70k good images and 30k images with defects. It will be appreciated that generating highly imbalanced image datasets may not be effective in certain instances because the Neural Networks maybe trained improperly and thus perform poorly.

Figure 11:
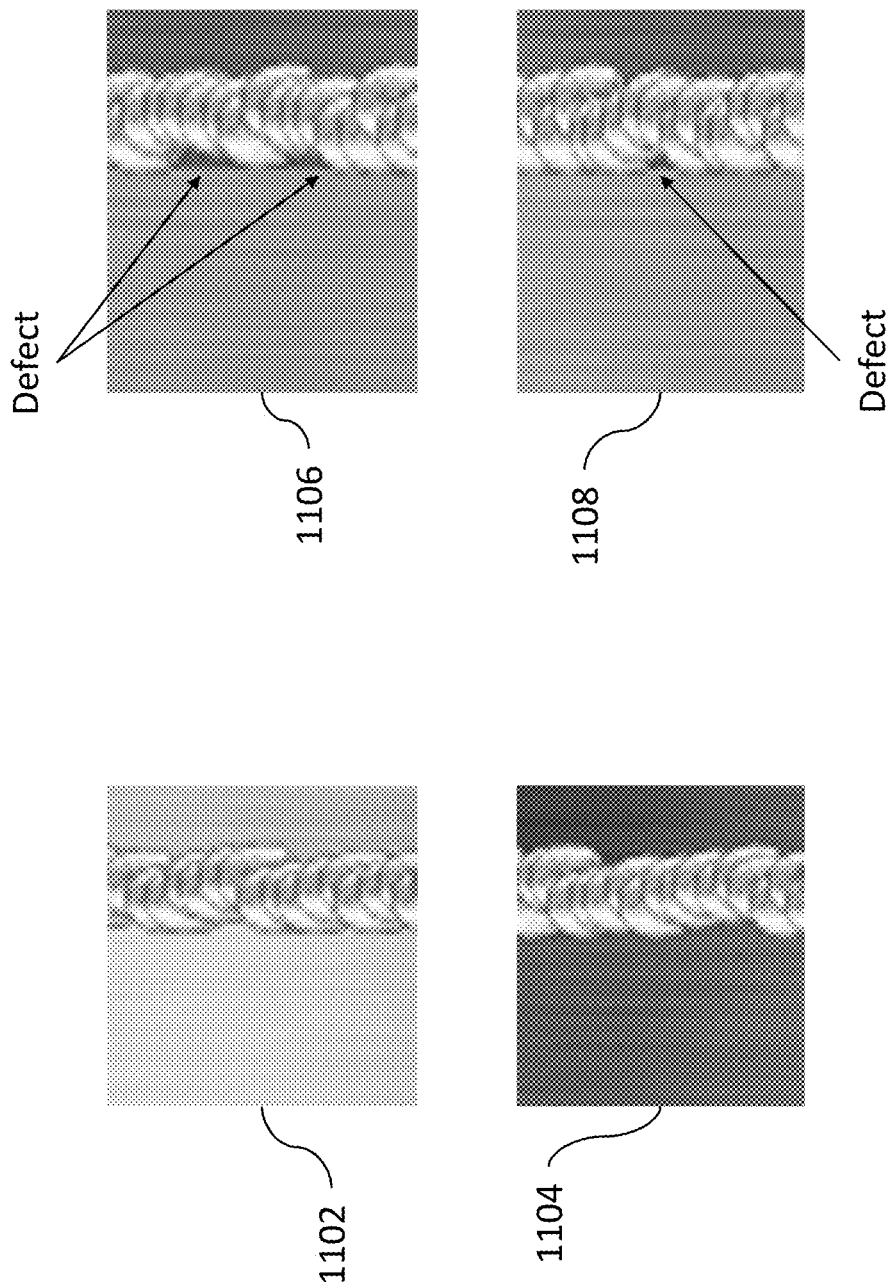
FIG. 11 shows multiple examples of both defective and non-defective welds according to certain example embodiments.
Figure 12:
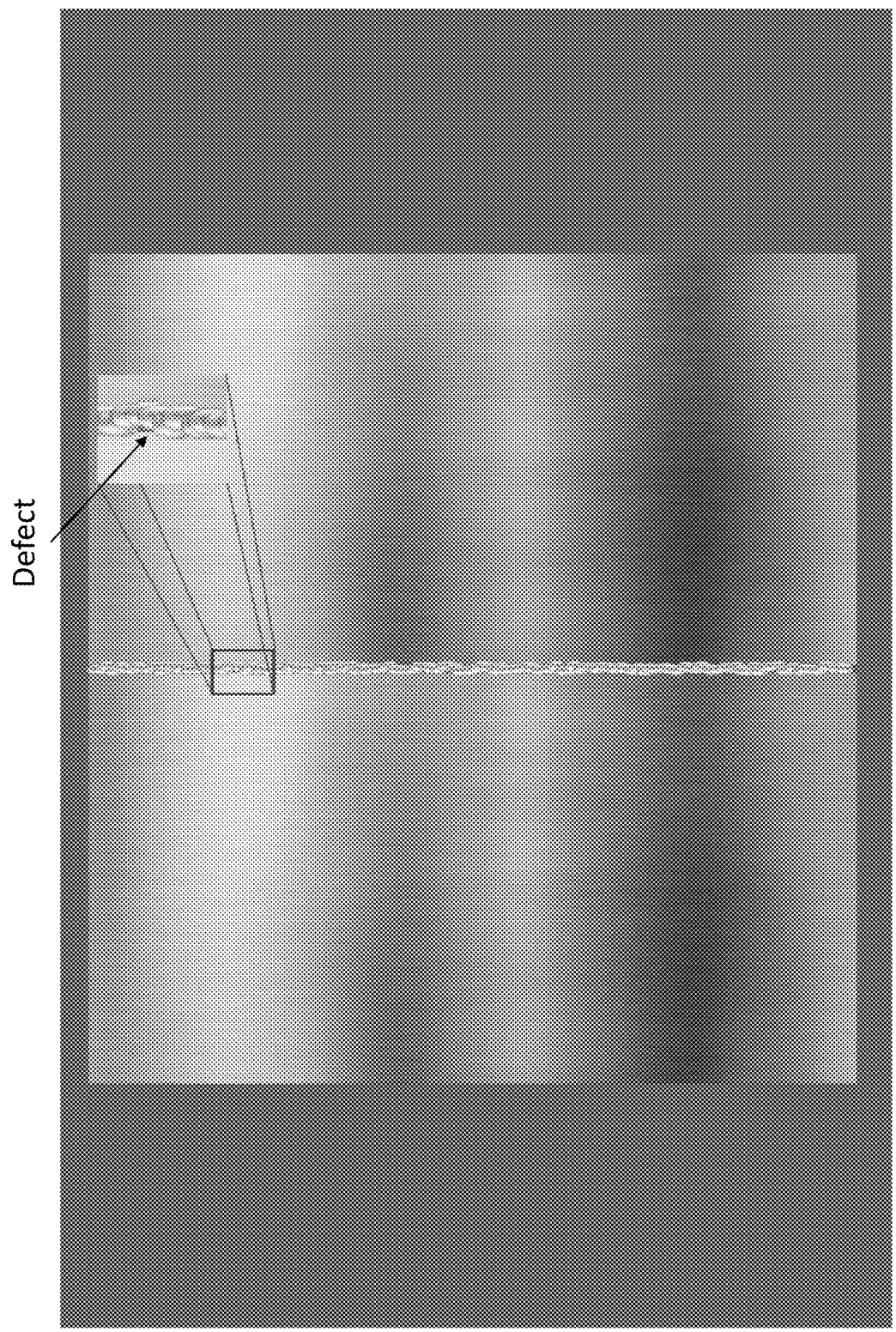
FIG. 12 shows an example of localizing a defect that is identified in a real image according to certain example embodiments.

All of these parameters may be used by the data generator module 202 that performs the image generation process 302 to generate thousands or even millions of different images that all include subtle variations due to the randomness introduced into how the weld is generated for those images. FIG. 11 provides 4 examples of different welds that may be generated as part of images according to the certain example embodiments. Examples 1102 and 1104 are good weld samples that would be labeled as such by the data generator module 202.

In contrast, examples 1106 and 1108 are defect weld samples that would be labeled as such by the data generator module 202. The defective areas of these samples are shown in FIG. 11 where the certain portions of the weld of varied too much in the horizontal direction.

The provided system that can thus serve to develop robust deep learning models using synthetically generated images. This allows for savings on manual effort in the generation of such images and savings in manual effort for detecting defects in welded plates. It also advantageously provides for improved quality of the welding, thus making the entire manufacturing process more robust and efficient.

Figure 13:
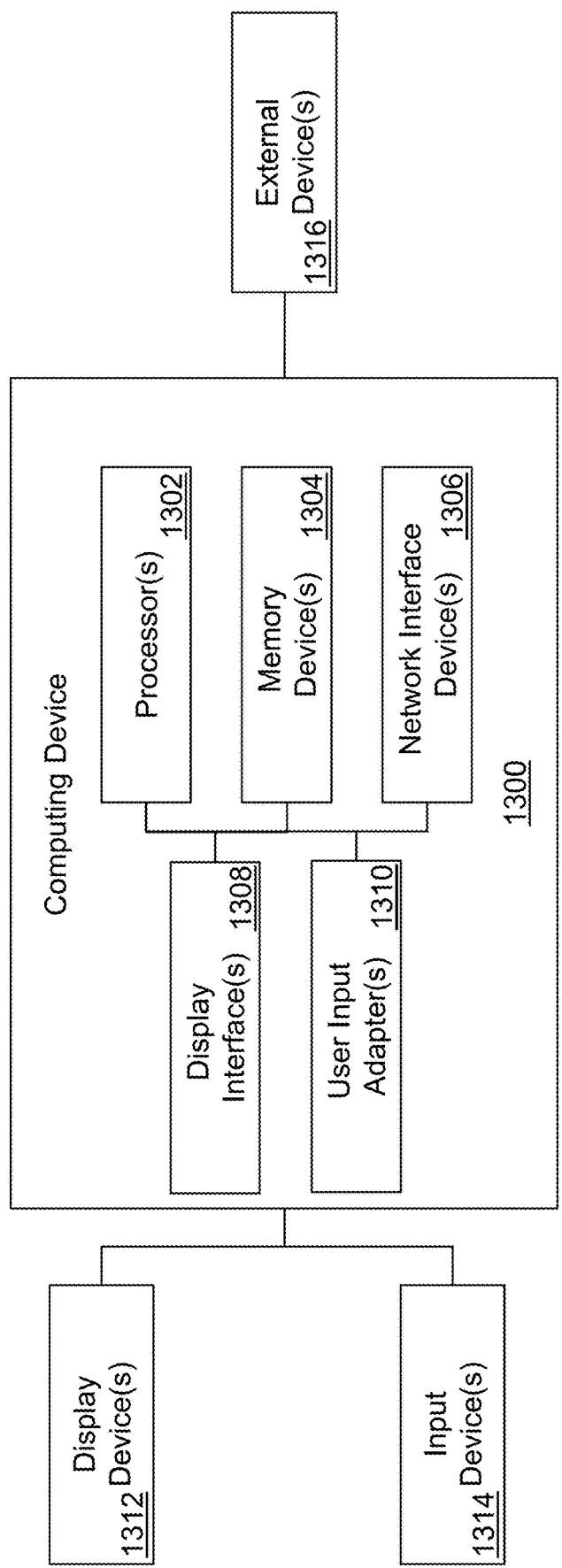
FIG. 13 shows an example computing device that may be used in some embodiments to implement features described herein.

Description of FIG. 13

FIG. 13 is a block diagram of an example computing device 1300 (which may also be referred to, for example, as a "computing device," "computer system," or "computing system") according to some embodiments. In some embodiments, the computing device 1300 includes one or more of the following: one or more processors 1302; one or more memory devices 1304; one or more network interface devices 1306; one or more display interfaces 1308; and one or more user input adapters 1310. Additionally, in some embodiments, the computing device 1300 is connected to or includes one or more display devices 1312. Additionally, in some embodiments, the computing device 1300 is connected to or includes one or more input devices 1314. In some embodiments, computing device 1300 may be connected to one or more external devices 1316. As will explained below, these elements (e.g., the processors 1302, memory devices 1304, network interface devices 1306, display interfaces 1308, user input adapters 1310, display devices 1312, input devices 1314, external devices 1316) are hardware devices (for example, electronic circuits or combinations of circuits) that are configured to perform various different functions for and/or in conjunction with the computing device 1300.

In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes, for example, a CPU, a GPU, and other hardware components such as memory and/or a memory controller (e.g., Northbridge), I/O controller (e.g., Southbridge), networking interfaces, and the like). In some embodiments, each or any of the processors 1302 uses an instruction set architecture such as x86 or Advanced RISC Machine (ARM). In some embodiments, each or any of the processors 1302 is or includes, for example, a graphical processing unit (GPU), which may be an electronic circuit designed to generate images and the like.

In some embodiments, each or any of the memory devices 1304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions that may be executed by one or more of the processors 1302), or other type of device that performs the volatile or non-volatile storage of data and/or instructions (e.g., software that is executed on or by processors 1302). Memory devices 1304 are an example of non-transitory computer-readable storage.

In some embodiments, each or any of the network interface devices 1306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (e.g., IEEE 802.11), GSM, CDMA2000, UMTS, LTE, LTE-Advanced (LTE-A), and/or other short-range (e.g., Bluetooth Low Energy, RFID), mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1308 is or includes one or more circuits that receive data from the processors 1302 (e.g., via a discrete GPU, an integrated GPU, a CPU executing graphical processing, or the like) that are used to generate corresponding image data based on the received data, and/or output (e.g., a High-Definition Multimedia Interface (HDMI), a DisplayPort Interface, a Video Graphics Array (VGA) interface, a Digital Video Interface (DVI), or the like) the generated image data to the display device 1312, which displays the image data thereon. Alternatively or additionally, in some embodiments, each or any of the display interfaces 1308 is or includes, for example, a video card, video adapter, or graphics processing unit (GPU). In other words, the each or any of the display interfaces 1308 may include a processor therein that is used to generate image data. The generation or such images may occur in conjunction with processing performed by one or more of the processors 1302.

In some embodiments, each or any of the user input adapters 1310 is or includes one or more circuits that receive and process user input data from one or more user input devices (1314) that are included in, attached to, or otherwise in communication with the computing device 1300, and that output data based on the received input data to the processors 1302. Alternatively or additionally, in some embodiments each or any of the user input adapters 1310 is or includes, for example, a PS/2 interface, a USB interface, a touchscreen controller, or the like; and/or the user input adapters 1310 facilitates input from user input devices 1314.

In some embodiments, the display device 1312 may be a Liquid Crystal Display (LCD) display, Light Emitting Diode (LED) display, or other type of display device. In embodiments where the display device 1312 is a component of the computing device 1300 (e.g., the computing device and the display device are included in a unified housing), the display device 1312 may be a touchscreen display or non-touchscreen display. In embodiments where the display device 1312 is connected to the computing device 1300 (e.g., is external to the computing device 1300 and communicates with the computing device 1300 via a wire and/or via wireless communication technology), the display device 1312 is, for example, an external monitor, projector, television, display screen, etc. . . . .

In some embodiments, each or any of the input devices 1314 is or includes machinery and/or electronics that generates a signal that is provided to the user input adapter(s) 1310 in response to physical phenomenon. Examples of inputs devices 1314 include, for example, a keyboard, a mouse, a trackpad, a touchscreen, a button, a joystick, a sensor (e.g., an acceleration sensor, a gyro sensor, a temperature sensor, and the like). In some examples, one or more input devices 1314 generate signals that are provided in response to a user providing an input—for example, by pressing a button or actuating a joystick. In other examples, one or more input devices generate signals based on sensed physical quantities (e.g., such as force, temperature, etc. . . . ). In some embodiments, each or any of the input devices 1314 is a component of the computing device (for example, a button is provide on a housing that includes the processors 1302, memory devices 1304, network interface devices 1306, display interfaces 1308, user input adapters 1310, and the like).

In some embodiments, each or any of the external device(s) 1316 includes further computing devices (e.g., other instances of computing device 1300) that communicate with computing device 1300. Examples may include a server computer, a client computer system, a mobile computing device, a cloud-based computer system, a computing node, an Internet of Things (IoT) device, etc. . . . that all may communicate with computing device 1300. In general, external devices(s) 1316 may include devices that communicate (e.g., electronically) with computing device 1300. As an example, computing device 1300 may be a cloud based computer system or a computer that is in a factory that communicates over the Internet with a server computer system that is an example of external device 1316. Conversely, computing device 1300 may be a server computer system that communicates with a computer in a manufacturing center that is an example external device 1316.

In various embodiments, the computing device 1300 includes one, or two, or three, four, or more of each or any of the above-mentioned elements (e.g., the processor(s) 1302, memory device(s) 1304, network interface device(s) 1306, display interface(s) 1308, user input adapter(s) 1310, display device(s) 1312, input device(s) 1314). Alternatively or additionally, in some embodiments, the computing device 1300 includes one or more of: a processing system that includes the processors 1302; a memory or storage system that includes the memory devices 1304; and a network interface system that includes the network interface devices 1306.

The computing device 1300 may be arranged, in various embodiments, in many different ways. As just one example, the computing device 1300 may be arranged such that the processors 1302 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1300 may be arranged such that: the processors 1302 include two, three, four, five, or more multi-core processors; the network interface devices 1306 include a first network interface device that implements Ethernet and a second network interface device that implements WiFi and/or Bluetooth; and the memory devices 1304 include a RAM and a flash memory or hard disk. As another example, the computing device 1300 may include a SoC with one or processors 1302, plural network interface devices 1306, memory devices 1304 that include system memory and memory for application programs and other software, a display interface 13068 that is configured to output a video signal, a display device 1312 that is integrated to a housing and layered with a touch screen input device 1314, one or more buttons, and one or more sensors.

As previously noted, whenever it is described in this document that a software module or software process performs any action, the action is in actuality performed by underlying hardware elements according to the instructions that comprise the software module. Consistent with the foregoing, in various embodiments, each or any combination of the transmitter 114, browser 116, defect detection module 120, notification module 122, alarm module 132, browser 140, data generator module 202, model builder module 204, model (re-) training module 206, deep neural network 208, gap creation process 303A, mimic weld process 303, image generator 302, etc., each of which will be referred to individually for clarity as a "component" for the remainder of this paragraph, are implemented using an example of the computing device 1300 of FIG. 5. In such embodiments, the following applies for each component: (a) the elements of the 1300 computing device 1300 shown in FIG. 13 (i.e., the one or more processors 1302, one or more memory devices 1304, one or more network interface devices 1306, one or more display interfaces 1308, and one or more user input adapters 1310), or appropriate combinations or subsets of the foregoing, with or without the one or more display devices 1312, one or more input devices 1314, and/or external devices 1316) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1304 (e.g., in various embodiments, in a volatile memory device such as a RAM or an instruction register and/or in a non-volatile memory device such as a flash memory or hard disk) and all actions described herein as performed by the software modules are performed by the processors 1302 in conjunction with, as appropriate, the other elements in and/or connected to the computing device 1300 (e.g., the network interface devices 1306, display interfaces 1308, user input adapters 1310, display device(s) 1312, input device(s) 1314, and/or external device(s) 1316); (c) alternatively or additionally, to the extent it is described herein that the component processes and/or otherwise handles data, in some embodiments, such data is stored in the memory devices 1304 (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing device 1300 (e.g., the network interface devices 1306, display interfaces 1308, user input adapters 1310, display device 512, input device(s) 1314, and/or external device(s) 1316); (d) alternatively or additionally, in some embodiments, the memory devices 1302 store instructions that, when executed by the processors 1302, cause the processors 1302 to perform, in conjunction with, as appropriate, the other elements in and/or connected to the computing device 1300 (e.g., the memory devices 1304, network interface devices 1306, display interfaces 1308, user input adapters 1310, display device(s) 512, input device(s) 1314, and/or external device(s) 1316), each or any combination of actions described herein as performed by the component and/or by any software modules described herein as included within the component.

The hardware configurations shown in FIG. 13 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 13, (e) via other hardware arrangements, architectures, and configurations, and/or via combinations of the technology described in (a) through (e).

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may,"

"can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Advantages

In certain example embodiments, the approach of image generation discussed herein may use randomness to generate a balanced set of images with and without defects. Such an approach advantageously may provide a training dataset for machine learning purposes that performs better other techniques of image generation.

In certain example embodiments, the techniques discussed herein advantageously use the random movement of the seam to create defects. Thus, by increasing the randomness in the techniques for how the images of the welds are generated additional defective images may be generated to allow for scalability in the process of training a model.

In certain example embodiments, the techniques discussed herein advantageously label the generated images at the time of creation. The advantageously avoids having to manually label thousands or millions of different images.

In certain example embodiments, the techniques discussed herein advantageously address a problem of relying on "real" data for training a model. Instead, in certain example embodiments, synthesized datasets are created in anomalies are infused into the overall dataset (e.g., using the randomness techniques discussed herein). This thus can address the problem of there being (relatively) few data points to train for anomaly detection.

Additional Applications of Described Subject Matter

While the techniques herein have been described in connection with welding and metal plates, they may also be applied in other industrial areas. For example, in the maintenance and repair of concrete infrastructure. Such processes are costly as the structures may require a thorough and timely inspection. The techniques herein may be applied to such situations to detect defects in the physical surfaces of the concrete. This may include generating many images of concrete structures using multiple base images. Images of the concrete structures and roads may be generated with and without defects. The defects in such structure may have repeating patterns and these patterns can be learnt through training deep neural net models on this data.

Although process steps, algorithms or the like, including without limitation with reference to FIG. 3, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for generating training datasets to training a model that is used to analyze a manufacturing process, the computer system comprising:
   non-transitory memory configured to store at least first and second base images;
   a processing system that includes at least one hardware processor, the processing system configured to:
      generate a plurality of training images that are each generated by combining the first and second base images together, wherein each of the plurality of images is generated by randomly varying a location of at least the first base image with respect to the second base image, wherein the first base image is a seam image for a weld and the second base image is a plate image for one of multiple plates to be welded, wherein each one of the plurality of training images includes a plurality of instances of the seam image overlapping one another to form a weld along a gap between at least two instances of the plate image;
      train a model based on the plurality of training images and corresponding labels associated with each of the plurality of training images;
      receive a plurality of real images of the manufacturing process;
      generate, for each of the plurality of real images, a prediction by using the model to predict whether a defect is contained with a corresponding one of the plurality of real images; and accept user input to set at least one of a horizontal and vertical randomness factor, wherein the location of each of the plurality of instances of the seam image is further based on the accepted user in put for the at least one of the horizontal and vertical randomness factor.

2. The computer system of claim 1, wherein the manufacturing process includes welding at least two plates together.

3. The computer system of claim 2, wherein the location of each of the plurality of instances of the seam image are randomly varied in at least one of a horizontal and vertical direction with respect to the two instances of the plate images.

4. The computer system of claim 2, wherein the processing system is further configured to:
accept user input to set a width for the gap between the at least two instances of the plate image.

5. The computer system of claim 2, wherein the processing system is further configured to:
accept user input to set a size at which the seam of the weld between the at least two instances of the plate image are to be formed.

6. The computer system of claim 1, wherein the processing system is further configured to:
generate, based on one of the predictions, a message that indicates a defect has been identified in the corresponding one of the plurality of real images.

7. The computer system of claim 6, wherein the message includes a location of the defect within the corresponding one of the plurality of real images.

8. The computer system of claim 1, wherein the processing system is further configured to issue a command to automatically control at least some part of the manufacturing process based on detection of a defect within one of the plurality of real images.

9. The computer system of claim 1, wherein the model is a Deep Neural Network.

10. The computer system of claim 1, wherein each of the plurality of training images are automatically labeled when generated as including defective or non-defective properties.

11. The computer system of claim 1, wherein the model that is trained using the plurality of training images is then retrained using transfer learning with image of the manufacturing process.

12. A non-transitory computer readable storage medium comprising an application program for use with a computer system that generates training datasets for neural networks, the application program comprising instructions that cause the computer system to:
load a weld seam image and second image of a plate that is to be welded;
generate a preparation image that includes at least two instances of the plate separated by a gap;
(a) generate a training image by sequentially applying a plurality of instances of the weld seam image over the gap, wherein each successive one of the plurality of instances overlaps a prior instance, wherein a location at which each of the plurality of instances is applied over the gap is varied based on a randomness factor; and
repeat (a) to generate a plurality of training images that are varied due to application of the randomness factor to each one of the plurality of training images;
wherein the randomness factor controls a location at which a corresponding instance is applied with respect to the gap in at least one of a vertical and horizontal direction.

13. The non-transitory computer readable storage medium of claim 12, wherein the application program comprises further instructions that cause the computer system to:
accept user input to set a width for the gap between the at least two instances of the plate image.

14. The non-transitory computer readable storage medium of claim 12, wherein the application program comprises further instructions that cause the computer system to:
accept user input to set a size at which the seam of the weld between the at least two instances of the plate image is to be formed.

15. A non-transitory computer readable storage medium comprising an application program for use with a computer system that generates training datasets for neural networks, the application program comprising instructions that cause the computer system to:
load a weld seam image and second image of a plate that is to be welded;
generate a preparation image that includes at least two instances of the plate separated by a gap;
(a) generate a training image by sequentially applying a plurality of instances of the weld seam image over the gap, wherein each successive one of the plurality of instances overlaps a prior instance, wherein a location at which each of the plurality of instances is applied over the gap is varied based on a randomness factor;
repeat (a) to generate a plurality of training images that are varied due to application of the randomness factor to each one of the plurality of training images; and
accept user input to control how much the randomness factor applies to the location in at least one of a horizontal and vertical direction.

16. The non-transitory computer readable storage medium of claim 12, wherein the application program comprises further instructions that cause the computer system to:
train a model based on the generated plurality of training images.

17. A method implemented on a computer for generating training datasets for neural networks, the method comprising:
loading, from electronic memory, a weld seam image and second image of a plate that is to be welded;
preparing a preparation image that includes at least two instances of the plate separated by a gap;
(a) generating a training image by sequentially applying a plurality of instances of the weld seam image over the gap, wherein each successive one of the plurality of instances overlaps a prior instance, wherein a location at which each of the plurality of instances is applied over the gap is varied based on a randomness factor; and
repeating (a) to generate a plurality of training images that are varied due to application of the randomness factor to each one of the plurality of training images,
wherein the randomness factor controls a location at which a corresponding instance is applied with respect to the gap in at least one of a vertical and horizontal direction.

18. The method of claim 17, further comprising accepting user input to control how much the randomness applies to the location in at least one of a horizontal and vertical direction.

* * * * *